United States Patent
Bruno et al.

(10) Patent No.: US 6,249,675 B1
(45) Date of Patent: Jun. 19, 2001

(54) METHOD AND APPARATUS FOR NETWORK PAGING

(75) Inventors: Richard Frank Bruno, Morristown; Howard Paul Katseff, Englishtown; Robert Edward Markowitz, Glen Rock; Bethany Scott Robinson, Lebanon, all of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/131,066

(22) Filed: Aug. 7, 1998

(51) Int. Cl.[7] .............................. H04Q 7/20; H04B 7/00; H04M 1/64
(52) U.S. Cl. ................. 455/426; 455/31.2; 379/88.12; 379/88.17; 340/825.44
(58) Field of Search .................... 455/31.1, 31.2, 455/31.3, 458, 445, 434, 422, 414, 417, 517, 426, 461, 459; 379/88.12, 88.15, 88.17, 210, 211, 212; 370/241, 352, 474, 475; 340/286.01, 286.02, 825.44

(56) References Cited

U.S. PATENT DOCUMENTS

| | | | |
|---|---|---|---|
| 5,261,052 | * 11/1993 | Shimamoto et al. ................. | 709/206 |
| 5,343,512 | * 8/1994 | Wang et al. .......................... | 455/410 |
| 5,541,983 | * 7/1996 | Rose ...................................... | 379/201 |
| 5,561,703 | * 10/1996 | Arledge et al. ...................... | 455/31.2 |
| 5,604,788 | 2/1997 | Tett ......................................... | 379/58 |
| 5,608,786 | 3/1997 | Gordon ................................. | 379/100 |
| 5,649,289 | 7/1997 | Wang et al. ......................... | 455/31.3 |
| 5,675,507 | 10/1997 | Bobo, II ............................ | 364/514 R |
| 5,691,708 | 11/1997 | Batchelder et al. ............. | 340/825.44 |
| 5,712,901 | 1/1998 | Meermans .............................. | 379/88 |
| 5,732,074 | * 3/1998 | Spaur et al. .......................... | 370/313 |
| 5,737,707 | * 4/1998 | Gaulke et al. ....................... | 455/556 |
| 5,745,689 | * 4/1998 | Yeager et al. ........................ | 709/206 |
| 5,757,901 | * 5/1998 | Hiroshige ............................. | 379/212 |
| 5,781,857 | * 7/1998 | Hwang et al. ....................... | 455/412 |
| 5,802,470 | * 9/1998 | Gaulke et al. ....................... | 455/426 |
| 5,809,128 | * 9/1998 | McMullin ............................ | 379/215 |
| 5,828,949 | * 10/1998 | Silver et al. ........................ | 455/38.3 |
| 5,844,969 | * 12/1998 | Goldman et al. ................. | 379/93.24 |
| 5,867,495 | * 2/1999 | Elliott et al. ......................... | 370/352 |
| 5,872,523 | * 2/1999 | Dellaverson et al. .......... | 340/825.52 |
| 5,953,322 | * 9/1999 | Kimball ................................ | 370/328 |
| 6,023,503 | * 2/2000 | Schneider et al. ................... | 379/188 |

\* cited by examiner

*Primary Examiner*—Vivian Chang
*Assistant Examiner*—Charles N. Appiah
(74) *Attorney, Agent, or Firm*—Oliff & Berridge, PLC

(57) ABSTRACT

The invention provides a network paging system that includes a method and apparatus for sending messages to a subscriber. When one party attempts to contact another party, via a page message for example, the system may determine if the paged party is logged onto the network system. If the paged party is logged onto the network, the page message may be sent to the paged party's personal computer. If the paged party is not logged onto the network, the page message may be sent to the paged party's pager. Advantageously, the invention eliminates the need or expense of sending a message both via the Internet and a pager.

16 Claims, 5 Drawing Sheets

METHOD AND APPARATUS FOR NETWORK PAGING

BACKGROUND OF THE INVENTION

1. Field of Invention

This invention relates to a method and apparatus for sending paging messages to a subscriber.

2. Description of Related Art

The use of wireless communication systems and services has become widespread in the business and home environments. For example, one of the most common methods used today for staying in contact with the home or office is paging. Paging systems are a convenient way to contact a person (or to be contacted) when that person is not close to a telephone or at a location where the telephone number is not known.

However, when a paging system subscriber is in his or her own office environment, receiving pages may become impractical or difficult due to reception problems, etc. In addition, some paging subscribers turn off or do not carry their pagers when in the office, making it difficult to contact them.

SUMMARY OF THE INVENTION

The invention provides a network paging system that includes a method and apparatus for sending messages to a subscriber. When one party attempts to contact another party, via a page message for example, the system may determine if the paged party is logged onto the network system. If the paged party is logged onto the network, the page message may be sent to the paged party's personal computer. If the paged party is not logged onto the network, the page message may be sent to the paged party's pager. Advantageously, the invention eliminates the need or expense to send a message both via the Internet and a pager.

These and other features and advantages of this invention are described in or are apparent from the following detailed description of the preferred embodiments.

BRIEF DESCRIPTION OF THE DRAWINGS

The invention is described in detail with reference to the following drawings, wherein like numerals represent like elements, and wherein.

DETAILED DESCRIPTION OF PREFERRED EMBODIMENTS

Figure 1:
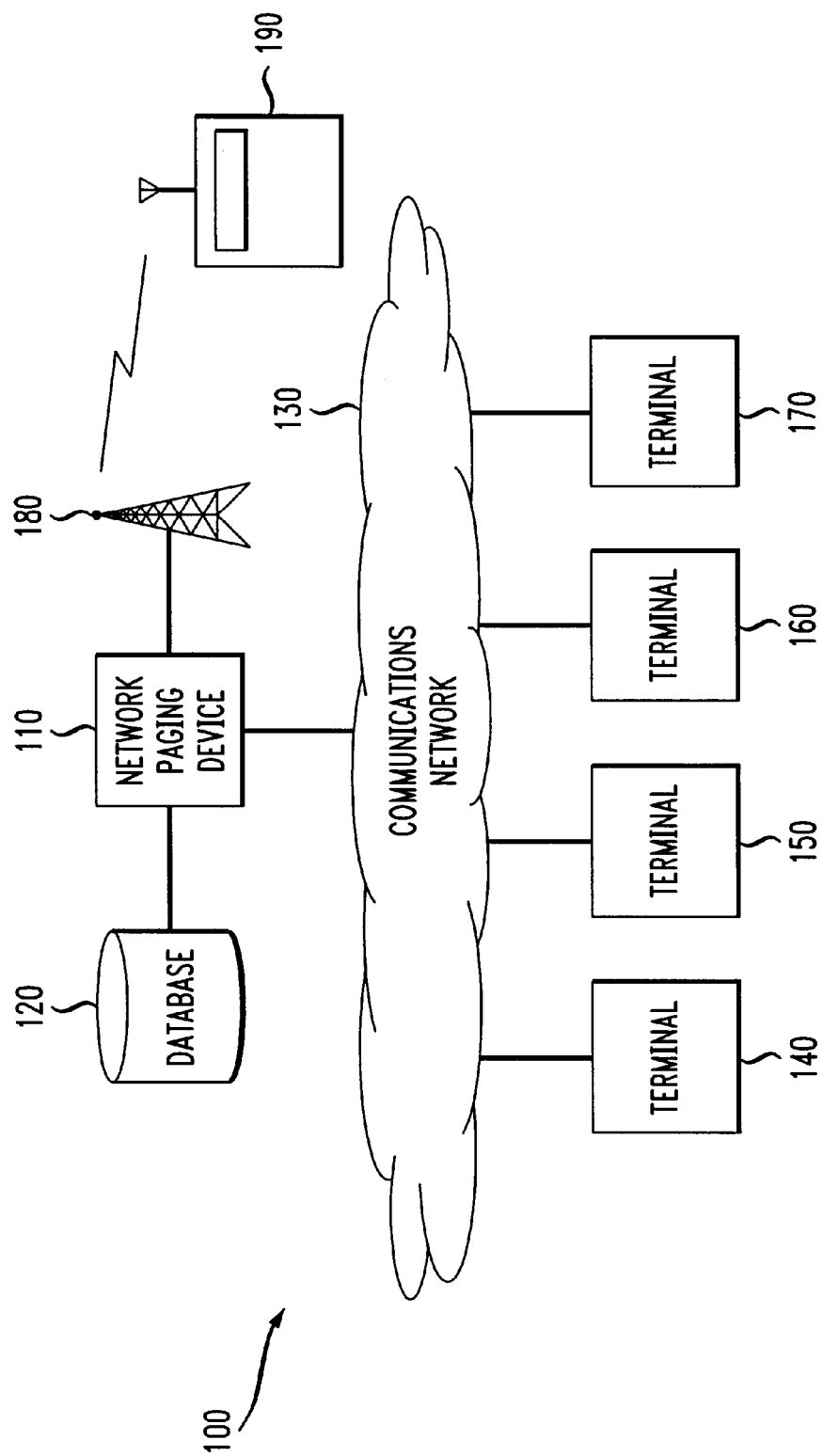
FIG. 1 is a block diagram of an exemplary network paging system.

FIG. 1 shows an exemplary embodiment of a network paging system 100 that includes a communications network 130 connected to several communication terminals 140, 150, 160 and 170. The communication terminals 140, 150, 160 and 170 may represent telephone stations, personal computers, or any other device which may send and receive communications. The communications network 130 is also coupled to a network paging device 110. When distributed, servers of the communications network 130 interface with the terminals 140, 150, 160 and 170 and serve as control units of the network paging device 110, performing all of its functions. For the following description, the network paging device 110 is assumed to be centralized for ease of discussion.

The network paging device 110 is connected to a database 120. The database 120 can be stored on any memory device internal or external to the network paging device 110. The network paging device 110 is coupled to a wireless communications tower, such as pager tower 180 or a mobile base station for cellular phones, which provides broadcasting capabilities to wirelessly communicate with portable communication devices, such as a pager 190. The pager 190 may represent any wireless communication device that receives paging messages, such as a pager, cellular telephone, facsimile machine, portable computer, etc.

A first party uses the terminal 160 in an attempt to contact (or page) a second party at the pager 190 through the communications network 130, the network paging device 110 and the pager tower 180, for example. The network paging device 110 queries the database 120 to determine whether the second party is a subscriber. If the second party is not a subscriber, the network paging device 110 pages the second party at the pager 190, for example. If the second party is a subscriber, the network paging device 110 checks to see if the subscriber (second party) is logged onto a network within or connected to the communications network 130. If the subscriber is logged on, say at terminal 170, the network paging device 110 retrieves the subscriber's IP address and password from the database 120, which was sent to the network paging device 110 from the subscriber's terminal at the time the subscriber logged on. Using the subscriber's IP address, the network paging device 110 then notifies the subscriber at the terminal 170 that a page has been received and queries the subscriber for a password. Once the subscriber enters the correct password, the network paging device 110 delivers the page message to the subscriber.

If the network paging device 110 determines that subscriber is not logged onto a network, the network paging device 110 pages the subscriber via pager 190 through paging tower 180, for example.

Figure 2:
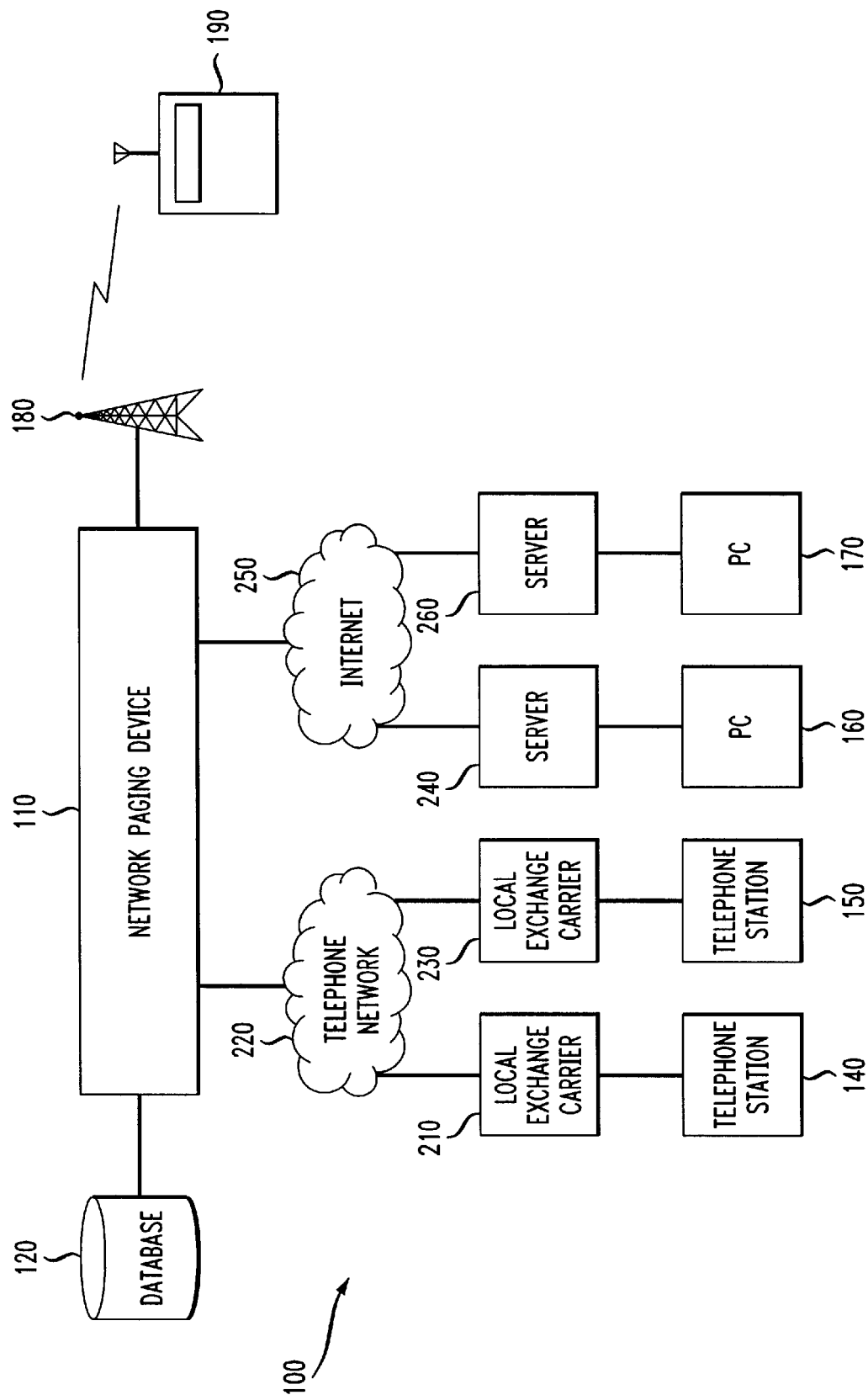
FIG. 2 is a specific example of the network paging system shown in FIG. 1.

FIG. 2 shows a specific example of the network paging system 100 shown in FIG. 1. The communications network 250—in this example, the Internet—is connected to personal computers (PCs) 160 and 170 through servers 240 and 260, respectively. While the Internet 250 is used here for ease of discussion, it is to be understood that the communications network may be any other type of data network used for communication and data transfer, including local area networks (LANs), wide area networks (WANs), and the like. The Internet 250 is also coupled to the network paging device 110.

The network paging device 110 is connected to a database 120 and is also coupled to a wireless communications tower, such as pager tower 180, or a mobile base station which provides broadcasting capabilities to wirelessly communicate with portable communication devices, such as a pager 190. The network paging device 110 is further connected to the telephone network 220. Telephone network 220 is connected to telephone stations 140 and 150 via local exchange carriers 210 and 230, respectively.

When a subscriber logs onto the Internet 250 at PC 170, for example, the subscriber's server 260 sends the subscriber's IP address, for example, to the network paging device 110 through the Internet 250. The network paging device 110 stores the subscriber's IP address in the database 120.

When a first party, using the telephone station 140, for example, pages a subscriber, the page is routed to the network paging device 110 through the local exchange carrier 210. For alphanumeric pagers, the first party usually reaches a live operator who keys in the text of the page, and the page is then routed to the network paging device 110. The network paging device 110 receives the page and checks the database 120 to see if the subscriber is logged onto the Internet 250.

If the network paging device 110 determines that the subscriber is logged onto the Internet 250, the network paging device 110 retrieves the subscriber's IP address and password from the database 120. The network paging device 110 also initiates and decrements a timer to ensure that the paging message is authenticated by the subscriber within a predetermined time. The network paging device 110 then notifies the subscriber at PC 170 that a page has been received and then queries the subscriber for a password. If the subscriber enters the correct password before the timer expires, the network paging device 110 sends the page to the subscriber at PC 170.

If the subscriber is logged onto the Internet 250 but is temporarily away from the PC 170, the subscriber may receive a page notification from the network paging device 110 but not be able to respond to the authentication query before the predetermined time. In this instance, if the timer expires, the network paging device 110 contacts the subscriber at pager 190 via paging tower 180, for example.

Alternatively, if the network paging device 110 determines that the subscriber is not logged onto the Internet 250, the network paging device 110 pages the subscriber at the pager 190.

The network paging device 110 may forward a variety of paging information to the subscriber. For example, the network paging device 110 may record and send multimedia messages, such as text, audio, or video. Furthermore, the caller's number may be recognized by the network paging device 110 via the caller ID feature, such as Automatic Name Identification (ANI), and the caller's name, phone number, etc. may be forwarded to the subscriber. The subscriber may also be paged by the first party using the PC 160 through server 240 and the network paging device 110.

When the subscriber logs off from the Internet 250, the subscriber's PC server 260 notifies the network paging device 110. The network paging device 110 then removes the subscriber's IP address from the database 120 so that all incoming pages will be forwarded to the subscriber's pager 190, for example.

As an alternative embodiment, when a subscriber logs onto the Internet 250 at PC 170, the subscriber enters a password which is sent to the network paging device 110 for comparison with the password stored with the subscriber's profile information stored in the database 120. Once the subscriber is authenticated with the proper password, the network paging device 110 will forward a page received for the subscriber without waiting for a proper password. The subscriber only has to acknowledge receipt of the message and is not bothered with having to enter a password each time a page is received.

Alternatively, the subscriber may enter the password once at log-on, and the PC 170 may store the password and send it to the network paging device 110 automatically for each page notification received. This embodiment would also relieve the subscriber from repeatedly entering a password in order to receive a page.

Figure 3:
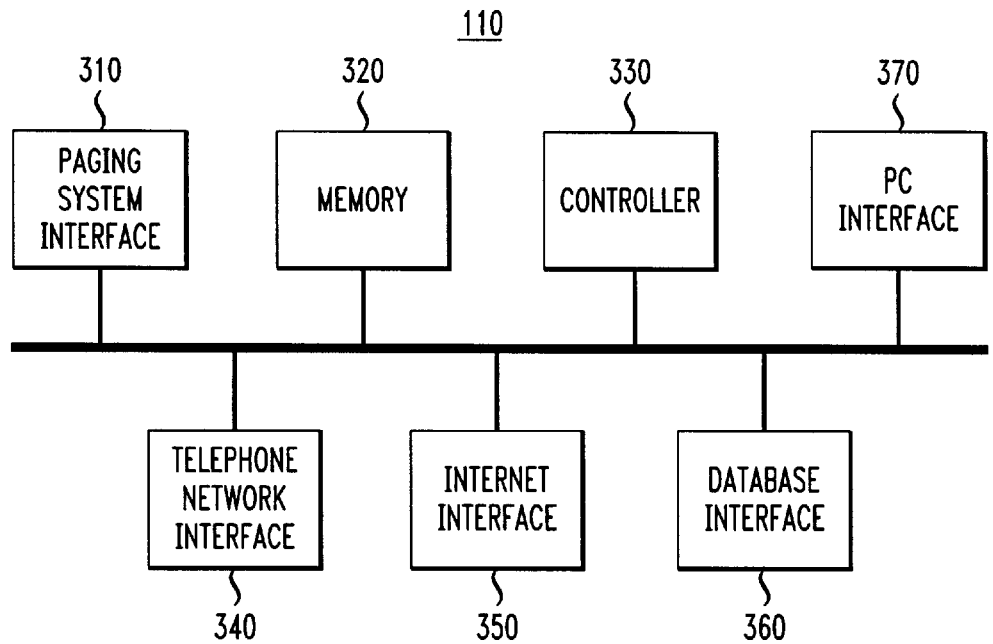
FIG. 3 is a block diagram of the network paging device.

FIG. 3 is a block diagram of the network paging device 110. The network paging device 110 may include a controller 330, a memory 320, a telephone network interface 340, an Internet interface 350, a paging system interface 310, a database interface 360, and a PC interface 370. The above elements of the network paging device 110 may found as part of a single standalone unit or may be distributed as a part of a local exchange carrier or server, for example.

When a subscriber is logged onto a communications network, such as the Internet 250, the subscriber is connected to controller 330. The controller 330 authenticates the identity of the subscriber with subscriber profiles in memory 320 (or external database 120 via the database interface 360). The controller 330 then receives the subscriber's IP address via Internet interface 350. After receiving the subscriber's IP address, the controller 330 stores the subscriber's IP address in the memory 320.

When a first party pages a subscriber, the page is received by the controller 330 through the Internet interface 350, for example. The controller 330 checks the memory 320 to determine whether the subscriber is logged onto the Internet 250. If the controller 330 determines that the subscriber is not logged onto the Internet 250, the controller 330 pages the subscriber at pager 190 via the paging system interface 310.

However, if the controller 330 determines that the subscriber is logged onto the Internet 250, the controller retrieves the subscriber's IP address, password and any subscriber profile information from the memory 320. The controller 330 then digitizes and temporarily stores the page and any related message in the memory 320. Prior to storing the page, however, the controller 330 secures the page with the subscriber's password, so that other parties may not improperly intercept and view the page message in an open office area, for example.

The controller 330 then sets a counter to a given period of time for the subscriber to acknowledge receipt. The controller 330 notifies the subscriber at PC 170 via Internet interface 350 (or through PC interface 370) that a page has been received. The controller 330 then periodically decrements the counter and waits to receive the correct password from the subscriber. If the subscriber does not properly authenticate the page within the predetermined time (i.e., the subscriber is not at the PC 170 and the counter times out), the controller 330 pages the subscriber at pager 190 via the paging system interface 310.

However, if the controller 330 receives the correct subscriber password via the Internet interface 350, the controller 330 forwards the page to the subscriber's PC 170 via the Internet interface 350 and server 260.

When a subscriber logs off from the Internet 250, the controller 330 receives a message from the subscriber's server 260 via the Internet 250 and Internet interface 350 to remove the subscriber's IP address from the memory 320. Upon receipt of the message, the controller 330 removes the subscriber's IP address from the memory 320.

Figure 4:
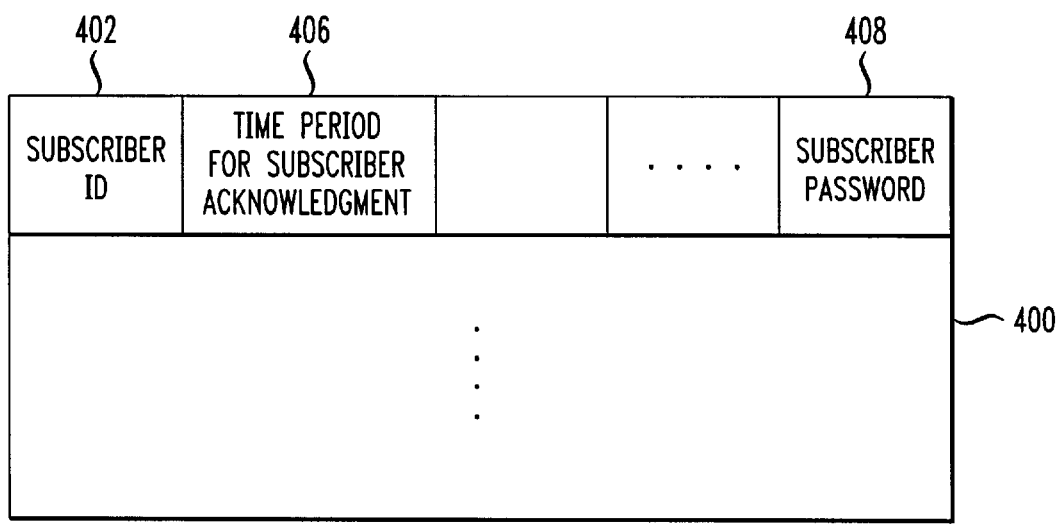
FIG. 4 is a diagram illustrating sample subscriber profile information for the network paging device.

FIG. 4 illustrates a sample of the subscriber profile information 400 which may be stored in database 120. For example, the subscriber profile 400 may include the subscriber's ID number 402, and a number of subscriber options, including a time limit 406 to notify the subscriber at the subscriber's PC such as PC 170, and a password 408.

As discussed above, if the subscriber is logged onto the Internet 250, the controller 330 will set and decrement a counter to wait for an authentication from a subscriber from the subscriber's PC 170. If the subscriber does not acknowledge receipt within the subscriber's predetermined time limit 406, the controller 330 will determine that the subscriber is not at the PC 170 and will send the page message to the subscriber's pager 190, for example.

In addition, the subscriber profile 400 may include personalized passwords 408 to secure a page message for authentication purposes. Therefore, when a subscriber is paged at the PC 170, the subscriber may enter the personalized password to obtain the page message. Thus, the subscriber may have the freedom to select passwords that are easy to remember. While these specific options are shown in FIG. 4, many other options may be provided to customize the network paging device 110 to suit the needs of subscribers.

Figure 5:
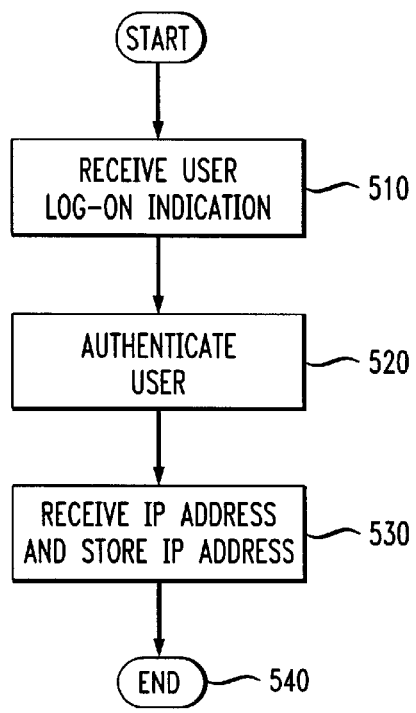
FIG. 5 is a flowchart of the log-on process for a network paging device subscriber.
Figure 7:
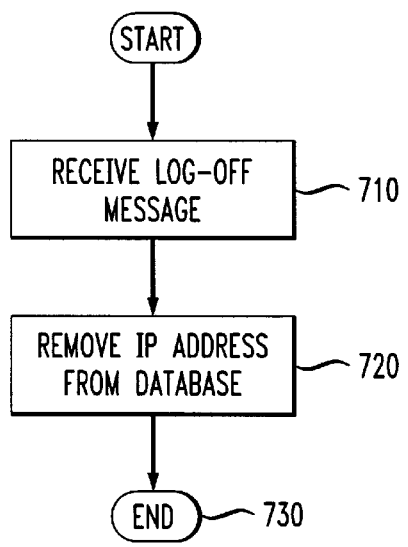
FIG. 7 is a flowchart of the log-off process for a network paging device subscriber.
Figure 6:
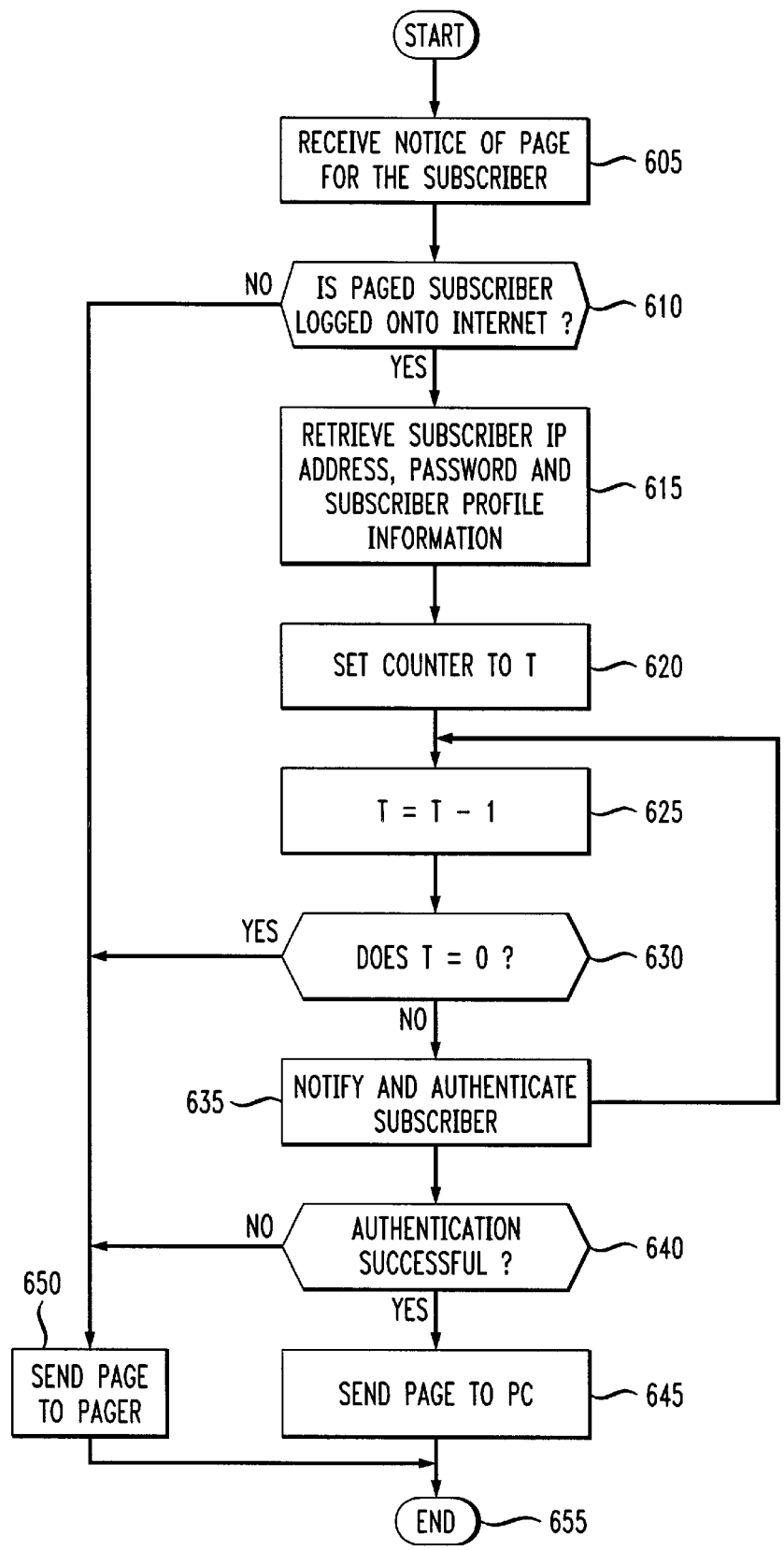
FIG. 6 is a flowchart of the network paging device process.

FIGS. 5–7 are flowcharts describing the network paging process. FIG. 5 illustrates the log-on process for a network paging device subscriber. The log-on process may use a dedicated software package such that, when a subscriber logs onto the Internet, the software to receive page messages is automatically started on the subscriber's PC 170 and the PC 170 notifies the network paging device controller 330 that the user is logged on through server 260. For example, beginning with step 510, the controller 330 receives an indication that a subscriber is logged on and goes to step 520. At step 520, the controller 330 authenticates the subscriber and proceeds to step 530. At step 530, the controller 330 receives and stores the subscriber's IP address in the memory 320, and goes to step 540 and ends.

In FIG. 6, beginning with step 605, the controller 330 receives a page from the first party for the subscriber and goes to step 610. At step 610, the controller 330 determines if the subscriber is logged onto the Internet 250. If the subscriber is logged onto the Internet 250, the controller 330 goes to step 615. Otherwise, the controller 330 goes to step 650. At step 650, the controller 330 sends the page message to the subscriber's pager 190, and goes to step 655 and ends.

At step 615, the controller 330 retrieves the subscriber's IP address, password, and subscriber profile information, and goes to step 620. At step 620, the controller 330 sets a counter to a predetermined time T, from the subscriber profile, for example. At step 625, the controller 330 decrements the counter and goes to step 630. At step 630, the controller 330 determines if the counter has reached zero. If the counter has reached zero, the process jumps to step 650, where the controller 330 sends the page to the subscriber's pager 190.

If the counter has not reached zero, the process goes to step 635 where the controller notifies the subscriber that a page has been received and queries the subscriber for the correct authentication (or password), and goes to step 640. At step 640, the controller 330 determines whether the subscriber has returned the proper authenticating password. If the subscriber has not been successfully authenticated, the controller 330 jumps to step 650 and pages the subscriber via pager 190. If the controller 330 determines that the subscriber has returned the proper authentication, the process goes to step 645 where the controller 330 sends the page message to the PC 170. The process then goes to step 655 and ends.

FIG. 7 illustrates the log-off process for a network paging device subscriber. Beginning with step 710, the controller 330 receives an indication from PC 170 through server 260 that the subscriber has logged off from the Internet 250 and goes to step 720. At step 720, the controller 330 removes the IP address from the memory 320 and proceeds to step 730 and ends.

The network paging device 110 may be implemented on a programmed general purpose computer. However, the network paging device 110 may also be implemented on a special purpose computer, a programmed microprocessor or microcontroller and peripheral integrated circuit elements, and Application Specific Integrated Circuits (ASIC) or other integrated circuits, a hardwired electronic or logic circuit, such as a discrete element circuit, a programmable logic device such as a PLD, PLA, FGPA, or PAL, or the like. Furthermore, the functions of the network paging device 110 may be performed by a standalone unit or distributed throughout the communications network 130. In general, any device with a finite state machine capable of performing the functions of a network paging device 110, as described herein, can be implemented.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method for operating a paging service for handling a page from a party to a subscriber in a communications network, comprising:

receiving the page from the party in a network paging device;

receiving an indication that the subscriber is logged onto the communications network at a terminal;

receiving a subscriber's Internet Protocol (IP) address;

storing the subscriber's IP address in a database;

receiving an indication that the subscriber is logged-off of the communications network;

removing the subscriber's IP address from the database; and transmitting a page notification to the terminal if the subscriber is logged onto the communications network, and if the subscriber is not logged onto the communications network, transmitting a page message to a wireless communications device.

2. The method of claim 1, further comprising:

determining if the subscriber acknowledges the page notification from the terminal within a predetermined time period; and transmitting the page to the terminal if the determining step determines that the subscriber acknowledged the page notification within the predetermined time period.

3. The method of claim 2, further comprising transmitting the page message to the wireless communications device if the determining step determines that the subscriber did not acknowledge the page notification within the predetermined time period.

4. The method of claim 3, further comprising:

securing a page message with the password.

5. The method of claim 4, wherein the subscriber acknowledges the page notification using the password.

6. The method of claim 1, further comprising:

retrieving the subscriber's IP address from the database; and sending the page to the terminal corresponding to the subscriber's IP address.

7. The method of claim 1, further comprising retrieving a subscriber profile from the database.

8. The method of claim 7, wherein the subscriber profile comprises an identification of the subscriber, a password, and a predetermined period for response associated with the subscriber.

9. A device for operating a paging service for handling a page from a party to a subscriber in a communications network comprising:

a database; and a controller which receives the page from the party in a network paging device, receivers an indication that the subscriber is logged onto the communications network at a terminal, receives a subscriber's Internet Protocol (IP) address, stores the subscriber's IP address in the database, receives an indication that the subscriber is logged off from the communications network, removes the subscriber's IP address from the database, transmits a page notification to the terminal if the subscriber is logged onto the communications network, and if the subscriber is not logged onto the communications network, transmits a page message to a wireless communications device.

10. The device of claim 9, wherein the controller determines if the subscriber acknowledges the page notification from the terminal within a predetermined time period, and transmits the page message to the terminal if the controller determines that the subscriber acknowledged the page notification within the predetermined time period.

11. The device of claim 10, wherein the controller transmits the page message to the wireless communications device if the controller determines that the subscriber did not acknowledge the page notification within the predetermined time period.

12. The device of claim 11, wherein the controller secures the page message with the password.

13. The device of claim 12, wherein the subscriber acknowledges the page notification using the password.

14. The device of claim 9, wherein the controller retrieves the subscriber's IP address from the database, and sends the page notification to the terminal corresponding to the subscriber's IP address.

15. The device of claim 9, wherein the controller retrieves a subscriber profile from the database.

16. The device of claim 15, wherein the subscriber profile comprises an identification of the subscriber, a password, and a predetermined period for response associated with the subscriber.

* * * * *